(12) United States Patent
Long et al.

(10) Patent No.: US 12,109,652 B2
(45) Date of Patent: Oct. 8, 2024

(54) COPPER-TIN BRAZING WIRE AND PREPARATION METHOD AND USE THEREOF

(71) Applicant: ZHENGZHOU RESEARCH INSTITUTE OF MECHANICAL ENGINEERING CO., LTD., Henan (CN)

(72) Inventors: Weimin Long, Henan (CN); Sujuan Zhong, Henan (CN); Yinyin Pei, Henan (CN); Junlan Huang, Henan (CN); Quanbin Lu, Henan (CN); Yongtao Jiu, Henan (CN); Xusheng Zhou, Henan (CN); Mengjie Nie, Henan (CN)

(73) Assignee: ZHENGZHOU RESEARCH INSTITUTE OF MECHANICAL ENGINEERING CO., LTD., Henan (CN)

( * ) Notice: Subject to any disclaimer, the term of this patent is extended or adjusted under 35 U.S.C. 154(b) by 0 days.

(21) Appl. No.: 18/169,207

(22) Filed: Feb. 14, 2023

(65) Prior Publication Data

US 2023/0373036 A1 Nov. 23, 2023

(30) Foreign Application Priority Data

May 20, 2022 (CN) .......................... 202210553265.9

(51) Int. Cl.
*B23K 35/02* (2006.01)
*B23K 35/30* (2006.01)
(Continued)

(52) U.S. Cl.
CPC ........ *B23K 35/0227* (2013.01); *B23K 35/302* (2013.01); *B23K 35/404* (2013.01); *C22C 9/02* (2013.01)

(58) Field of Classification Search
CPC .............. B23K 35/0227; B23K 35/302; B23K 35/404; C22C 9/02
See application file for complete search history.

(56) References Cited

U.S. PATENT DOCUMENTS 6,186,390 B1 * 2/2001 Tadauchi ........... B23K 35/0244
228/56.3
6,346,215 B1 * 2/2002 Boegel .................. C22C 1/0425
420/473

(Continued)

FOREIGN PATENT DOCUMENTS

| CN | 201030475 Y | 3/2008 |
| CN | 204470808 U | 3/2015 |

(Continued)

OTHER PUBLICATIONS

PL-149319-B1, machine translation. (Year: 1986).*

(Continued)

*Primary Examiner* — John A Hevey
(74) *Attorney, Agent, or Firm* — Tarolli, Sundheim, Covell & Tummino LLP

(57) ABSTRACT

A copper-tin brazing wire and a preparation method and use thereof are provided. A copper-tin brazing wire includes a plurality of copper wires each having a composite metal layer on a surface thereof; the copper-tin brazing wire includes, in parts by weight, 75-84 parts of Cu, 20-25 parts of Sn, and 0.4-0.5 parts of P; and the composite metal layer includes Cu, Sn, and P, in which a mass ratio of Cu, Sn, and P is (45-55):(46-56):(0.5-1.5).

17 Claims, 2 Drawing Sheets

(51) Int. Cl.
  *B23K 35/40*   (2006.01)
  *C22C 9/02*    (2006.01)

(56)         References Cited

U.S. PATENT DOCUMENTS

2011/0014490 A1 *  1/2011  Wolfe .................... B32B 15/01
                                                      228/248.1
2021/0402525 A1 * 12/2021  Choi ................. B23K 35/0227
2022/0077093 A1 *  3/2022  Kondoh ............. B23K 35/0244

FOREIGN PATENT DOCUMENTS

CN      109454358 A      3/2019
CN      109465568 A      3/2019
CN      110315237 A     10/2019
CN      111468861 A      7/2020
GB         419960 A     11/1934
JP      S58159999 A      9/1983
PL         149319 B1 *   5/1986

OTHER PUBLICATIONS

Chinese Office Action for corresponding CN Application No. 2022105532659, dated Mar. 4, 2023, pp. 1-8.
Search Report for corresponding CN Application No. 2022105532659, dated Feb. 28, 2023, pp. 1-10.

* cited by examiner

COPPER-TIN BRAZING WIRE AND PREPARATION METHOD AND USE THEREOF

CROSS-REFERENCE TO RELATED APPLICATIONS

The present disclosure claims the priority to the Chinese Patent Application No. 202210553265.9, entitled "Copper-tin Brazing Wire and Preparation Method and Use thereof", and filed with the China Patent Office on May 20, 2022, the entire contents of which are incorporated herein by reference.

TECHNICAL FIELD

The present disclosure relates to the field of brazing materials, in particular to a copper-tin brazing wire and a preparation method and a use thereof.

BACKGROUND ART

Compared with silver-based brazing materials (brazing fill materials) (such as a flux-cored silver brazing material disclosed in CN111344105A, in which the content of zinc, a volatile element is Zn 27.0-37.0%), copper-tin brazing materials have the advantages of no volatile elements contained, low cost, and good brazing process performance, and are particularly suitable for brazing in a protective atmosphere furnace. Copper-tin brazing materials are often used for brazing homogeneous or heterogeneous materials, such as carbon steel, stainless steel, pure copper, and cupronickel.

An existing copper-tin brazing material BCu88Sn has a relatively high melting point of 825-990° C., and tends to cause thermal damage to the base material when used for brazing carbon steel or stainless steel. Although increasing the tin content in the copper-tin brazing material can reduce the melting temperature of the brazing material, it may significantly increase the brittleness of the brazing material and deteriorate the processability.

In view of this, the present disclosure is proposed.

SUMMARY

In an aspect, the present disclosure relates to a copper-tin brazing wire, including a plurality of copper wires each having a composite metal layer on a surface thereof;

the copper-tin brazing wire including, in parts by weight, 75-84 parts of Cu, 20-25 parts of Sn, and 0.4-0.5 parts of P; and the composite metal layer including Cu, Sn, and P, in which a mass ratio of Cu, Sn, and P is (45-55):(46-56):(0.5-1.5).

The copper-tin brazing wire has high alloying degree, high compositional uniformity of the brazing material, a Sn content of greater than 20%, low brittleness, and a reduced liquidus melting temperature of 800° C.

In another aspect, the present disclosure also relates to a preparation method of the copper-tin brazing wire, including:

coating a mixed molten liquid of Cu, Sn, and P on surfaces of copper wires, and twisting the coated copper wires into one strand to obtain the copper-tin brazing wire, wherein a mass ratio of Cu, Sn, and P in the mixed molten liquid is (45-55):(46-56):(0.5-1.5).

The preparation method of the copper-tin brazing wire is simple and easy to operate, and the prepared copper-tin brazing wire has high alloying degree, high compositional uniformity of the brazing material, low melting point, low brittleness, a Sn content of greater than 20%, and a reduced liquidus melting temperature of 800° C.

Compared with the prior art, the advantageous effects of the present disclosure are as follows.

(1) In the copper-tin brazing wire provided by the present disclosure, a plurality of ultra-fine copper wires as a base undergoes a high-temperature alloying reaction with a composite metal layer containing Cu, Sn, and P in a certain proportion to form multiple ultra-fine brazing wires. Compared with the alloying reaction of the single-strand wire, the copper-tin brazing wire of the present disclosure has high alloying degree and high compositional uniformity of the brazing material. The copper-tin brazing wire of the present disclosure has a Sn content of greater than 20%, low brittleness, and a reduced liquidus melting temperature of 800° C.

(2) The preparation method of the copper-tin brazing wire provided by the present disclosure is a simple method without complicated equipment or processes, and utilizes the high plasticity and large surface area of the ultra-fine copper wire. The mixed molten liquid containing Cu, Sn, and P in a certain proportion is coated on the surface of the ultra-fine copper wires, the ultra-fine copper wires and the mixed molten liquid are alloyed to form multiple brazing wires, and the multiple brazing wires are twisted into one strand to obtain a copper-tin brazing wire which has high alloying degree, high compositional uniformity of the brazing material, low melting point, low brittleness, a Sn content of greater than 20%, and a reduced liquidus melting temperature of 800° C.

BRIEF DESCRIPTION OF DRAWINGS

In order to clarify the technical solutions of the specific embodiments of the present disclosure or in the prior art, the drawings used for the specific embodiments of the present disclosure or the prior art will be briefly introduced. It is apparent that the drawings in the following description show some embodiments of the present disclosure. For those of ordinary skill in the art, other drawings can also be obtained according to these drawings without any creative effort.

REFERENCE SIGNS

1—bracket, 2—unwinding wheel, 3—high-pressure molten metal spray nozzle, 4—copper wire, 5—mixed molten liquid, 6—forming die, 7—stranding machine, 8—guide wheel, 9—sizing die, 10—molten metal tank, 11—ablation hole, 12—composite metal layer.

DETAILED DESCRIPTION OF THE EMBODIMENTS

The technical solutions of the present disclosure will be clearly and completely described below with reference to the drawings and specific embodiments, but those skilled in the art will understand that the examples described below are part, but not all, of the examples of the present disclosure, and merely used to illustrate the present disclosure but should not be construed as a limitation of the scope of the present disclosure. All other examples obtained by those of ordinary skill in the art based on the examples of the present disclosure without creative efforts shall fall within the protection scope of the present disclosure. If the specific conditions are not indicated in the examples, the examples are carried out according to the conventional conditions or the conditions recommended by the manufacturers. The used reagents or instruments without indication of the manufacturer are conventional products that can be purchased from the market.

Figure 1:
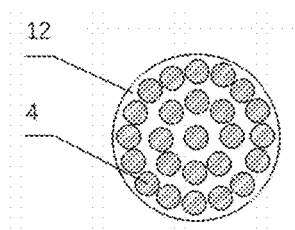
FIG. 1 is a cross-sectional schematic view of the copper-tin brazing wire provided by the present disclosure.
Figure 2:
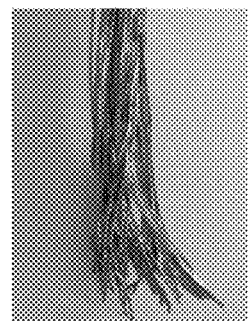
FIG. 2 shows a copper-tin brazing wire provided by the present disclosure after spraying molten metal.

In an aspect, the present disclosure relates to a copper-tin brazing wire including a plurality of copper wires each having a composite metal layer on a surface thereof, as shown in FIG. 1 and FIG. 2.

The copper-tin brazing wire includes, in parts by weight, 75-84 parts of Cu, 20-25 parts of Sn, and 0.4-0.5 parts of P.

The composite metal layer 12 includes Cu, Sn, and P, in which a mass ratio of Cu, Sn, and P is (45-55):(46-56):(0.5-1.5).

In some specific embodiments, in the copper-tin brazing wire, an amount of Cu may be, in parts by weight, for example, but not limited to, 75 parts, 77 parts, 79 parts, 81 parts, 83 parts, or 84 parts.

In some specific embodiments, in the copper-tin brazing wire, an amount of Sn may be, in parts by weight, for example, but not limited to, 20 parts, 21 parts, 22 parts, 23 parts, 24 parts, or 25 parts.

In some specific embodiments, in the copper-tin brazing wire, an amount of P may be, in parts by weight, for example, but not limited to, 0.4 parts, 0.42 parts, 0.44 parts, 0.46 parts, 0.48 parts, or 0.5 parts.

In some specific embodiments, the composite metal layer 12 includes Cu, Sn, and P, in which the mass ratio of Cu, Sn, and P may be, for example, but not limited to, 45:56:0.7, 47:54:0.5, 49:52:1.5, 51:50:1.3, 53:48:0.9, or 55:46:1.1.

The present disclosure uses the ultra-fine copper wires 4 with high plasticity, wherein the composite metal layers 12 containing Cu, Sn, and P are combined with the ultra-fine copper wires 4 and alloyed to form a plurality of copper wires each having a composite metal layer on the surface thereof. The plurality of copper wires each having a composite metal layer on the surface thereof form the copper-tin brazing wire.

Compared with the alloying reaction using a single-strand wire (single wire), the present disclosure in which the plurality of ultra-fine copper wires 4 participate in the alloying reaction, has high alloying degree and high compositional uniformity of the brazing material. The copper-tin brazing wire of the present disclosure overcomes the brittleness problem of the copper-tin brazing material with a high tin content. The obtained copper-tin brazing wire has a low melting point, a Sn content of higher than 20%, and reduced liquidus melting temperature of 800° C.

Preferably, the copper-tin brazing wire includes, in parts by weight, 78-82 parts of Cu, 21-24 parts of Sn, and 0.42-0.48 parts of P.

Preferably, the mass ratio of Cu, Sn, and P in the composite metal layer 12 is (48-52):(49-55):(0.8-1.2).

Preferably, the copper-tin brazing wire includes 5 to 25 (for example, 5, 7, 9, 11, 13, 15, 17, 19, 21, 23, or 25) copper wires each having a composite metal layer on the surface thereof.

Preferably, the copper wire 4 has a diameter of 0.018-0.022 mm.

In some specific embodiments, the diameter of the copper wire 4 may be, for example, but not limited to, 0.018 mm, 0.019 mm, 0.021 mm, or 0.022 mm.

Preferably, the copper-tin brazing wire is formed by intertwining the plurality of copper wires each having a composite metal layer on the surface thereof.

In another aspect, the present disclosure also relates to a preparation method of the copper-tin brazing wire, including:

coating a mixed molten liquid 5 of Cu, Sn, and P on surfaces of copper wires 4, and twisting the coated copper wires into one strand to obtain the copper-tin brazing wire, wherein a mass ratio of Cu, Sn, and P in the mixed molten liquid 5 is (45-55):(46-56):(0.5-1.5).

In some specific embodiments, the mass ratio of Cu, Sn and P in the mixed molten liquid 5 may be, for example, but not limited to, 45:56:0.7, 47:54:0.5, 49:52:1.5, 51:50:1.3, 53:48:0.9, or 55:46:1.1.

In the preparation method of the copper-tin brazing wire of the present disclosure, the ultra-fine copper wires 4 with high plasticity are used, the mixed molten liquid 5 containing Cu, Sn, and P is coated on the surfaces of the ultra-fine copper wires 4 to alloy them, thus forming a plurality of brazing wires, the plurality of brazing wires are then twisted into one strand by a stranding machine 7, and a low-melting-point copper-tin brazing wire is obtained through a sizing die 9. In the present disclosure, the plurality of copper wires 4 are used to participate in the reaction, the surface area thereof is large, the obtained brazing material has high alloying degree, and the compositional uniformity of the brazing material is high. The present disclosure breaks through the limitation of traditional preparation technology, and can obtain low-melting-point copper-tin brazing wire.

The preparation method of the copper-tin brazing wire provided by the present disclosure solves the brittleness problem of the copper-tin brazing material with a high tin content, and is capable of preparing the copper-tin brazing wire having a low melting point, a Sn content of higher than 20%, and a liquidus melting temperature reduced to 800° C.

Preferably, the mass ratio of Cu, Sn, and P in the mixed molten liquid 5 is (48-52):(49-57):(0.8-1.2).

Preferably, the copper-tin brazing wire includes, in parts by weight, 75-84 parts of Cu, 20-25 parts of Sn, and 0.4-0.5 parts of P.

In some specific embodiments, in the copper-tin brazing wire, an amount of Cu may be, in parts by weight, for example, but not limited to, 75 parts, 77 parts, 79 parts, 81 parts, 83 parts, or 84 parts.

In some specific embodiments, in the copper-tin brazing wire, an amount of Sn may be, in parts by weight, for example, but not limited to, 20 parts, 21 parts, 22 parts, 23 parts, 24 parts, or 25 parts.

In some specific embodiments, in the copper-tin brazing wire, an amount of P may be, in parts by weight, for example, but not limited to, 0.4 parts, 0.42 parts, 0.44 parts, 0.46 parts, 0.48 parts, or 0.5 parts.

Preferably, the mixed molten liquid 5 is formed by melting and mixing Cu, Sn, and Cu14P alloy.

Preferably, a melting temperature is 800-950° C.

In some specific embodiments, the melting temperature may be, for example, but not limited to, 800° C., 820° C., 850° C., 860° C., 870° C., 880° C., 900° C., 920° C., 940° C., or 950° C.

Preferably, winding is performed after the twisting.

Preferably, 5 to 25 (for example, 5, 6, 8, 10, 12, 14, 16, 18, 20, 22, or 25) coated copper wires are twisted into one strand to obtain the copper-tin brazing wire which is then wound.

Preferably, a winding speed is 8-15 mm/s.

In some specific embodiments, the winding speed is 8 mm/s, 9 mm/s, 10 mm/s, 11 mm/s, 12 mm/s, 13 mm/s, 14 mm/s, or 15 mm/s.

The winding speed is controlled within a certain range, which is advantageous to obtain more stable copper-tin brazing wire after winding.

In still another aspect, the present disclosure also relates to a brazing method using the copper-tin brazing wire or a copper-tin brazing wire prepared by the preparation method of the copper-tin brazing wire.

Figure 3:
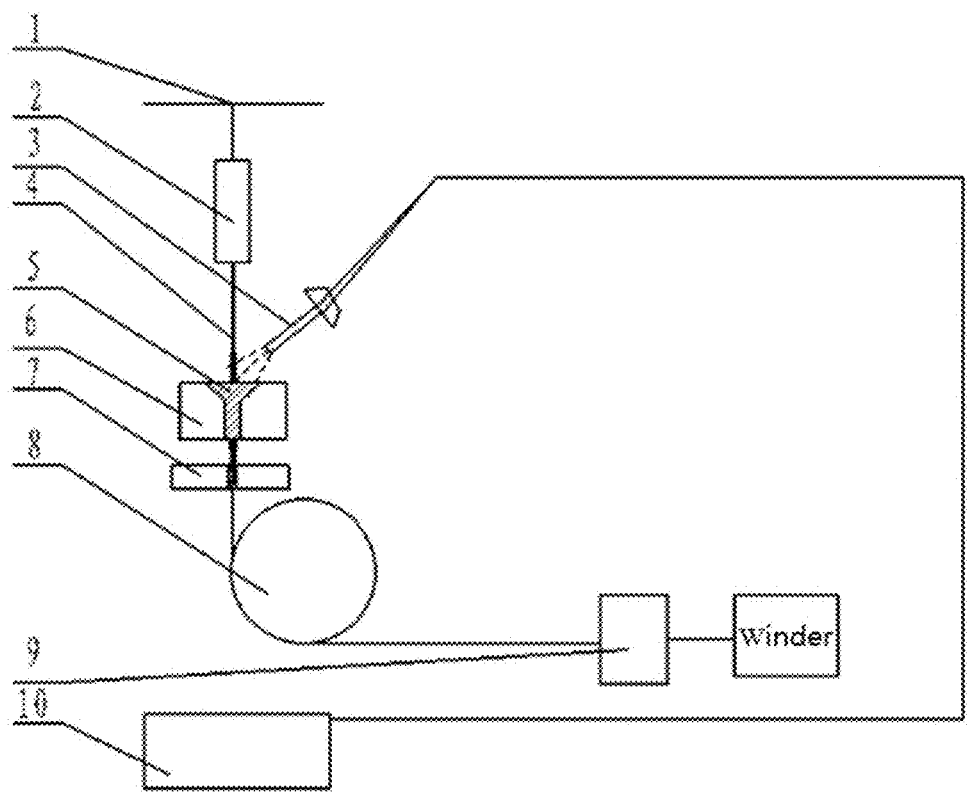
FIG. 3 is a schematic flow chart of preparation of the copper-tin brazing wire provided by the present disclosure.

Preferably, a device for preparing the copper-tin brazing wire includes a bracket 1, an unwinding wheel (wire releasing wheel) 2, a high-pressure molten metal spray nozzle 3, a forming die 6, a stranding machine 7, a guide wheel 8, a sizing die 9, and a winder and a molten metal tank 10, as shown in FIG. 3.

Preferably, the unwinding wheel 2, the forming die 6, the stranding machine 7, the guide wheel 8, the sizing die 9, and the winder are sequentially arranged on the bracket 1; the high-pressure molten metal spray nozzle 3 is arranged between the unwinding wheel 2 and the forming die 6; and the molten metal tank 10 is connected to the high-pressure molten metal spray nozzle 3.

The embodiments of the present disclosure will be described in detail below with reference to specific examples and comparative examples.

Example 1

A copper-tin brazing wire provided in this example included, in parts by mass, 75 parts of Cu, 25 parts of Sn, and 0.5 parts of P.

The preparation method of the copper-tin brazing wire provided in this example included the following steps.

(1) By using the unwinding wheel 2, the 5 copper wires 4 having a diameter of 0.02 mm were inserted together into a cavity of the forming die 6, then made to pass through a die hole of the stranding machine 7, the guide wheel 8, and the sizing die 9, and finally wound by the winder.

(2) The Cu, Sn and Cu14P alloy were placed in the molten metal tank 10, and melted into molten metal for use. The mass ratio of Cu:Sn:P was 49:50:1.

(3) The mixed molten liquid 5 of step (2) was continuously sprayed through the high-pressure molten metal spray nozzle 3 on the surfaces of the plurality of copper wires 4 inside the cavity of the forming die 6 to obtain a plurality of ultra-fine brazing wires.

(4) The power source of the stranding machine 7 was turn on, and twisted the plurality of ultra-fine brazing wires into one strand of brazing wire.

(5) The power source of the winder was turn on, to wind the brazing wire at a speed of 8 mm/s to obtain the copper-tin brazing wire.

Example 2

A copper-tin brazing wire provided in this example included, in parts by mass, 76 parts of Cu, 24 parts of Sn, and 0.48 parts of P.

The preparation method of the copper-tin brazing wire provided in this example differed from Example 1 only in that, in step (1), 10 copper wires 4 having a diameter of 0.02 mm were inserted together into the cavity of the forming die 6, and in step (5), the winding speed was 10 mm/s.

Example 3

A copper-tin brazing wire provided in this example included, in parts by mass, 78 parts of Cu, 23 parts of Sn, and 0.46 parts of P.

The preparation method of the copper-tin brazing wire provided in this example differed from Example 1 only in that, in step (1), 15 copper wires 4 having a diameter of 0.02 mm were inserted together into the cavity of the forming die 6, and in step (5), the winding speed was 10 mm/s.

Example 4

A copper-tin brazing wire provided in this example included, in parts by mass, 80 parts of Cu, 22 parts of Sn, and 0.42 parts of P.

The preparation method of the copper-tin brazing wire provided in this example differed from Example 1 only in that, in step (1), 20 copper wires 4 having a diameter of 0.02 mm were inserted together into the cavity of the forming die 6, and in step (5), the winding speed was 15 mm/s.

Example 5

A copper-tin brazing wire provided in this example included, in parts by mass, 84 parts of Cu, 20 parts of Sn, and 0.4 parts of P.

The preparation method of the copper-tin brazing wire provided in this example differed from Example 1 only in that, in step (1), 25 copper wires 4 having a diameter of 0.02 mm were inserted together into the cavity of the forming die 6, and in step (5), the winding speed was 8 mm/s.

Comparative Example

An existing BCu88Sn brazing material.

Experimental Example 1

Figure 4:
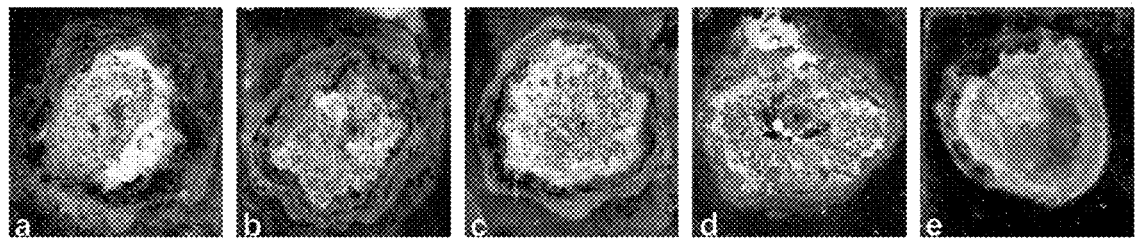
FIG. 4 is a black-and-white picture of the spreading morphology of the copper-tin brazing wire provided by the example of the present disclosure.
Figure 5:
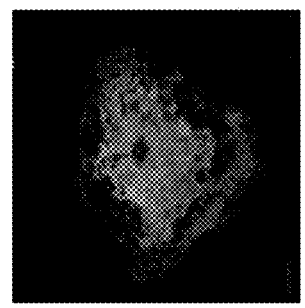
FIG. 5 is a black-and-white picture of the spreading morphology of BCu88Sn brazing material provided by the present disclosure.

In order to investigate the brazing process performances of the copper-tin brazing wire of the present disclosure and the existing BCu88Sn brazing material, the copper-tin brazing wires of the examples and the BCu88Sn brazing material of the comparative example were used as objects to measure the melting temperatures of respective brazing materials using a DTA thermal analyzer, and spreading wettability test was conduct on 40×40 mm 45 #carbon steel plate according to GB/T 11364 for the different brazing materials to measure the spreading areas of different brazing materials. The spreading morphology of the copper-tin brazing wires of the examples are shown in FIG. 4 (Example 1 in FIG. 4*a*, Example 2 in FIG. 4*b*, Example 3 in FIG. 4*c*, Example 4 in FIG. 4d, and Example 5 in FIG. 4e), and the spreading morphology of the BCu88Sn brazing material of the comparative example is shown in FIG. 5. The test results are listed in Table 1.

TABLE 1

Melting temperatures and spreading areas of different brazing materials

| | Brazing material melting temperature range/° C. | Brazing material spreading area/mm$^2$ |
|---|---|---|
| Example 1 | 774-900 | 258.9 |
| Example 2 | 765-853 | 266.1 |
| Example 3 | 758-820 | 276.3 |
| Example 4 | 755-800 | 286.5 |
| Example 5 | 786-900 | 260 |
| Comparative example | 825-990 | 220.4 |

As can be seen from Table 1, the melting temperatures of the copper-tin brazing wires provided by the present disclosure were relatively low, the liquidus temperatures thereof were all not higher than 900° C., and even the liquidus temperature of Example 4 was as low as 800° C., whereas the liquidus temperature of the BCu88Sn brazing material of the comparative example was relatively high and was about 990° C. This result showed that the copper-tin brazing wires provided by the present disclosure each had a lower melting point.

It can be seen from FIG. 4, FIG. 5, and Table 1 that the copper-tin brazing wires provided by the present disclosure each had a larger spreading area on carbon steel and better wetting performance. In addition, it can be seen from the spreading morphologies that the spreading morphologies of the copper-tin brazing wires provided by the present disclosure on carbon steel maintained a metallic color, whereas the spreading morphology of the BCu88Sn brazing material of the comparative example was yellow and dark due to the high melting temperature of the brazing material and surface oxidation. In conclusion, the copper-tin brazing wire having a lower melting temperature provided better spreading and wetting performance.

Experimental Example 2

In order to verify the brazing effects of different brazing materials, induction brazing of Bundy steel pipes was conducted for different brazing materials. The joint strength was measured by a universal tensile tester, and the brazing seam morphology was observed for comparison (see the brazing seam morphology of Example 4 in FIG. 6). The test method for the joint strength was carried out according to the method of GB/T 11363, and the test results are listed in Table 2.

TABLE 2

Joint strength test results

| | Joint tensile strength/MPa | Fracture location |
|---|---|---|
| Example 1 | 295 | Location of brazing seam |
| Example 2 | 284.4 | |
| Example 3 | 278 | |
| Example 4 | 275 | |
| Example 5 | 293 | |
| Comparative example | 265 | Location of base material near seam |

Figure 6:
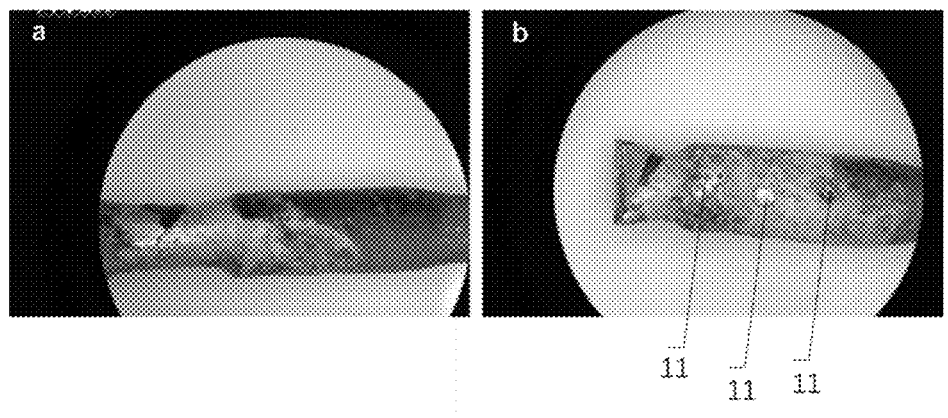
FIG. 6 is a black-and-white picture of the brazing seam morphology of a brazing joint provided by the present disclosure.

It can be seen from Table 2 and FIG. 6 that the tensile strengths of the brazing joints of the copper-tin brazing wires of the present disclosure were higher than the joint strength of the BCu88Sn brazing material of the comparative example. It can be seen from the brazing seam morphology that the base material in the BCu88Sn brazing seam was seriously damaged by heat, and many ablation holes 11 appeared on the surface, whereas the copper-tin brazing wire of the present disclosure had no ablation phenomenon and had good mechanical properties.

Although the present disclosure has been illustrated and described with specific examples, it should be appreciated that the above examples are merely used to illustrate the technical solutions of the present disclosure, but not to limit them. Those of ordinary skill in the art should understand that the technical solutions described in the above examples may be modified, or some or all of the technical features thereof may be equivalently replaced without departing from the spirit and scope of the present disclosure. These modifications or replacements do not render the essence of the corresponding technical solutions depart from the scope of the technical solutions of the examples of the present disclosure. Therefore, it means that all such substitutions and modifications that fall within the scope of the present disclosure are included in the appended claims.

The invention claimed is:

1. A copper-tin brazing wire comprising a plurality of copper wires each having a composite metal layer on a surface thereof;
   the copper-tin brazing wire comprising, in parts by weight, 75-84 parts of Cu, 20-25 parts of Sn, and 0.4-0.5 parts of P; and
   the composite metal layer comprising Cu, Sn, and P, wherein a mass ratio of Cu, Sn, and P is (45-55):(46-56):(0.5-1.5).

2. The copper-tin brazing wire according to claim 1, wherein the copper-tin brazing wire comprises, in parts by weight, 78-82 parts of Cu, 21-24 parts of Sn, and 0.42-0.48 parts of P.

3. The copper-tin brazing wire according to claim 1, wherein the mass ratio of Cu, Sn, and P in the composite metal layer is (48-52):(49-55):(0.8-1.2).

4. The copper-tin brazing wire according to claim 1, wherein the copper-tin brazing wire comprises 5 to 25 copper wires each having the composite metal layer on the surface thereof.

5. A preparation method of the copper-tin brazing wire according to claim 1, comprising steps of:
   coating a mixed molten liquid of Cu, Sn, and P on surfaces of the copper wires, and twisting a plurality of the coated copper wires into one strand to obtain the copper-tin brazing wire;
   wherein the mass ratio of Cu, Sn and P in the mixed molten liquid is (45-55):(46-56):(0.5-1.5).

6. The preparation method of the copper-tin brazing wire according to claim 5, wherein the copper wires each have a diameter of 0.018-0.022 mm.

7. The preparation method of the copper-tin brazing wire according to claim 5, wherein the copper-tin brazing wire comprises, in parts by weight, 78-82 parts of Cu, 21-24 parts of Sn, and 0.42-0.48 parts of P.

8. The preparation method of the copper-tin brazing wire according to claim 5, wherein the mixed molten liquid is formed by melting and mixing Cu, Sn, and Cu14P alloy.

9. The preparation method of the copper-tin brazing wire according to claim 5, wherein winding is performed after the twisting.

10. A brazing method, using the copper-tin brazing wire according to claim 1.

11. The copper-tin brazing wire according to claim 4, wherein the copper wires each have a diameter of 0.018-0.022 mm.

12. The copper-tin brazing wire according to claim 4, wherein the copper-tin brazing wire is formed by intertwining the plurality of copper wires each having the composite metal layer on the surface thereof.

13. The copper-tin brazing wire according to claim 2, wherein the copper-tin brazing wire comprises 5 to 25 copper wires each having the composite metal layer on the surface thereof.

14. The copper-tin brazing wire according to claim 3, wherein the copper-tin brazing wire comprises 5 to 25 copper wires each having the composite metal layer on the surface thereof.

15. The preparation method of the copper-tin brazing wire according to claim 8, wherein a melting temperature is 800-950° C.

16. The preparation method of the copper-tin brazing wire according to claim 9, wherein 5-25 coated copper wires are twisted into one strand to obtain the copper-tin brazing wire which is then wound.

17. The preparation method of the copper-tin brazing wire according to claim 9, wherein a winding speed is 8-15 mm/s.

* * * * *